United States Patent
Kim et al.

(10) Patent No.: US 11,878,639 B2
(45) Date of Patent: Jan. 23, 2024

(54) METHOD FOR CONTROLLING SOUND INSIDE VEHICLE AND VEHICLE AVN SYSTEM

(71) Applicant: SQAND CO. LTD., Daejeon (KR)

(72) Inventors: Yang-Hann Kim, Daejeon (KR); Jong-Hwa Lee, Daejeon (KR); Joon-Young Park, Seoul (KR); Wan-Jung Kim, Daejeon (KR); Hwan Kim, Seoul (KR)

(73) Assignee: SQAND CO. LTD.

( * ) Notice: Subject to any disclaimer, the term of this patent is extended or adjusted under 35 U.S.C. 154(b) by 583 days.

(21) Appl. No.: 16/317,271

(22) PCT Filed: Jul. 12, 2017

(86) PCT No.: PCT/KR2017/007487
§ 371 (c)(1),
(2) Date: Jan. 11, 2019

(87) PCT Pub. No.: WO2018/012890
PCT Pub. Date: Jan. 18, 2018

(65) Prior Publication Data
US 2023/0150441 A1    May 18, 2023

(30) Foreign Application Priority Data
Jul. 13, 2016    (KR) .......................... 10-2016-0088755

(51) Int. Cl.
*H04R 5/02* (2006.01)
*B60R 16/02* (2006.01)

(52) U.S. Cl.
CPC ............... *B60R 16/02* (2013.01); *H04R 5/02* (2013.01); *H04R 2499/13* (2013.01)

(58) Field of Classification Search
CPC ....... B60R 16/02; B60R 16/03; B60R 16/037; B60R 16/0315; H04R 5/02; H04R 2499/13; H04R 5/04; H04S 3/002; G06F 3/0488
See application file for complete search history.

(56) References Cited

U.S. PATENT DOCUMENTS 8,369,536 B2    2/2013  Kim et al.
2004/0240676 A1  12/2004  Hashimoto et al.
(Continued)

FOREIGN PATENT DOCUMENTS

JP    2002264732    9/2002
JP    2014165569    9/2014
(Continued)

OTHER PUBLICATIONS

International Search Report for Application No. PCT/KR2017/007487, dated Sep. 26, 2017. WO.
(Continued)

*Primary Examiner* — Jung Kim
(74) *Attorney, Agent, or Firm* — The Belles Group, P.C.

(57) ABSTRACT

A vehicle audio video navigation (AVN) system may be provided that includes: a plurality of source providers which receives a sound source; a user operation unit which selects at least one of a plurality of the sound sources input from the plurality of the source providers and selects a focusing zone of the sound source; a processor which generates a sound source signal for focusing an output of the selected sound source on the focusing zone; and a multi-channel amplifier which outputs the sound source signal. As a result, the focusing zone of each sound output within a vehicle can be individually controlled. Particularly, the focusing zone of each sound can be easily selected and controlled without changing the location of the speaker within the vehicle. Also, the sound source and the focusing zone within the
(Continued)

vehicle can be selected and controlled only by adding an external processor without replacing the AVN device provided in the vehicle.

5 Claims, 11 Drawing Sheets

(56) References Cited

U.S. PATENT DOCUMENTS

2006/0262935 A1  11/2006  Goose et al.
2009/0022330 A1   1/2009  Haulick et al.

FOREIGN PATENT DOCUMENTS

| KR | 1020090082978 | 8/2009 |
| KR | 101089108 | 12/2011 |
| KR | 1020130113745 | 10/2013 |

OTHER PUBLICATIONS

Supplemental European Search Report mailed in corresponding European Application No. 17827960.0 dated Feb. 13, 2020.

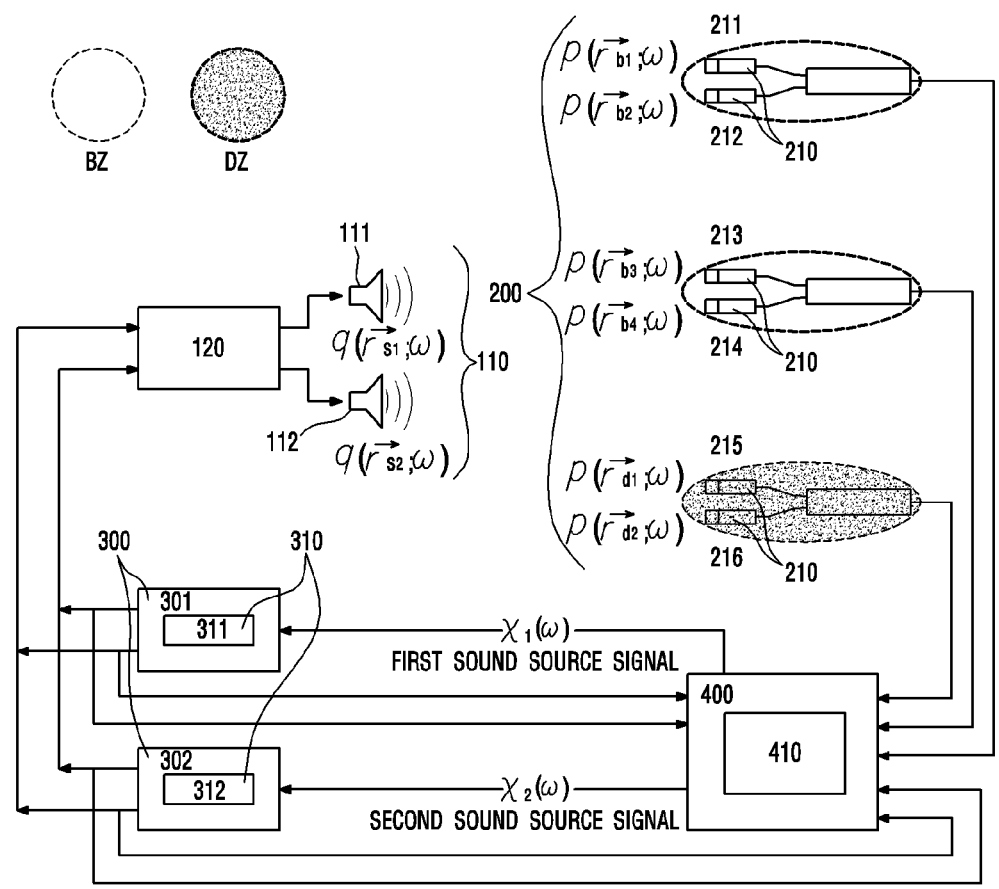

FIG5

| FOCUSING ZONE | FILTER COEFFICIENT |
|---|---|
| FL | FC1 |
| FR | FC2 |
| RL | FC3 |
| RR | FC4 |
| FL+FR | FC5 |
| RL+RR | FC6 |
| FR+RL+RR | FC7 |
| FL+FR+RL+RR | FC8 |
| ⋮ | ⋮ |

1300

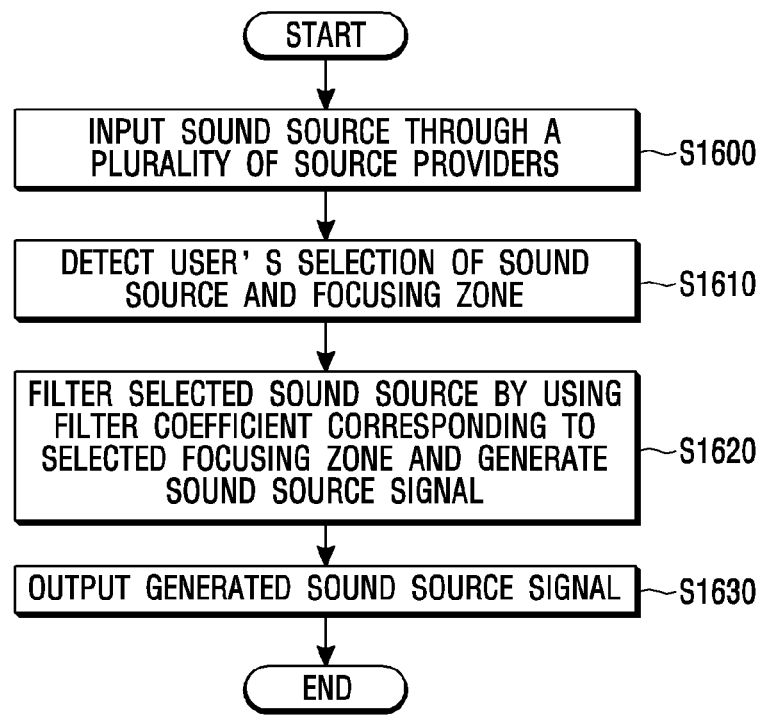

METHOD FOR CONTROLLING SOUND INSIDE VEHICLE AND VEHICLE AVN SYSTEM

CROSS-REFERENCE TO RELATED PATENT APPLICATIONS

The present application is a U.S. national stage application under 35 U.S.C. § 371 of PCT Application No. PCT/KR2017/007487, filed Jul. 12, 2017, which claims priority to Korean Patent Application No. 10-2016-0088755, filed Jul. 13, 2016. The disclosures of the aforementioned priority applications are incorporated herein by reference in their entireties.

TECHNICAL FIELD

The present disclosure relates to an in-vehicle sound control method and a vehicle audio video navigation (AVN) system, and more particularly to an in-vehicle sound control method capable of individually setting a listening location of various sound sources which can be output in a vehicle and a vehicle audio video navigation (AVN) system.

BACKGROUND ART

In addition to the development of an AVN system provided in a vehicle, more and more attentions are paid to a sound control in the vehicle. For example, a sound of a portable device such as a mobile terminal, a PMP, an MP3 player, etc., is output from a speaker through a wireless and wired connection means such as Bluetooth, AUX, etc. In particular, active research is being conducted to control the sound output from the speaker in the vehicle in accordance with a location in the vehicle (a rider's position).

A sound control technology includes, for example, a sound field reproduction method, an active noise control method which decreases a sound amount of a space by using a plurality of active sound sources, a method for changing an interval between the sound sources arranged in a specific shape, and a method for increasing a sound power which is radiated at a specific angle by changing a time delay between the sound sources and the magnitude of the sound input.

However, it is difficult to apply a mathematical solution for a specific sound source array to any sound source. For this reason, optimization research has been conducted to obtain a maximum directionality in a particular direction through the assumption of any sound source array. However, this research has assumed only any sound source array and is not suitable to be applied to a common listening space having radiation forms of various sound sources, sound reflection, and sound absorption.

Furthermore, U.S. Pat. No. 5,802,190 (Title of the invention: Linear speaker array) discloses a technology for controlling indirect characteristics such as directionality by using a limited assumption which ignores the distance to the listener or reflection, etc. U.S. Pat. No. 5,910,990 (Title of the invention: Apparatus and method for automatic equalization of personal multi-channel audio system) discloses a method for reproducing a signal without distortion by using transfer function.

Also, Korean Patent Application No. 10-2008-0125309 (Title of the invention: Directional sound generating apparatus and method) proposes a method for radiating a sound to a specific zone. However, it includes content that the sound is focused on the specific zone by disposing high directional speakers, etc.

The above-mentioned documents have a problem in that it is difficult to control a zone on which the sound is intended to be focused in the environment, for example, a vehicle, where the locations of the speakers are fixed. That is, a hardware-based change is necessarily required because the sound cannot be focused on the specific zone by using existing mounted speakers.

As such, the conventional method for controlling the sound in a space by using a plurality of the sound sources simply changes the time delay between the sound sources and the magnitude of the sound input, and only changes the directionality of the sound source by using a restricted type of the sound source array, without considering a rider's position in the vehicle.

For example, when a driver makes a voice call through Bluetooth, other riders in the vehicle do not need to hear the call contents. That is, it is necessary for the other calling party's voice output from the speaker to be focused on the driver. However, the above-mentioned method cannot focus the Bluetooth voice on the position of the driver because the locations of the speakers in the vehicle are fixed.

Furthermore, when an alarm sound is output from a navigation apparatus during the playing of music through the AVN system in the vehicle, there is a case where the music and the alarm sound from the navigation apparatus are simultaneously output from the same speaker. Here, there is a need to control the position where the output of the music is focused and the position where the alarm sound of the navigation apparatus is focused.

As such, there are high technical requirements for individually controlling the focusing locations of call voice, music sound, and navigation sound, etc., which are output within the vehicle.

DISCLOSURE

Technical Problem

The embodiment of the present invention is designed to overcome the above problems. The object of the present invention is to provide an in-vehicle sound control method capable of individually selecting, adjusting, and controlling a focusing zone of each sound output within a vehicle, and a vehicle audio video navigation (AVN) system. Also, the object of the present invention is to provide the in-vehicle sound control method capable of easily selecting and controlling the focusing zone of the sound output within the vehicle by using existing mounted speakers without changing the location of the speaker within the vehicle, and the vehicle audio video navigation (AVN) system.

Technical Solution

One embodiment is a vehicle audio video navigation (AVN) system may be provided that includes: a plurality of source providers which receives a sound source; a user operation unit which selects at least one of a plurality of the sound sources input from the plurality of the source providers and selects a focusing zone of the sound source; a processor which generates a sound source signal for focusing an output of the selected sound source on the focusing zone; and a multi-channel amplifier which outputs the sound source signal.

The multi-channel amplifier may simultaneously or selectively output the sound source signal generated for each of the plurality of the sound sources.

An interior space of the vehicle may be divided into a plurality of the focusing zones. The vehicle AVN system may further include a storage which stores a filter coefficient corresponding to each of the plurality of the focusing zones.

The processor may filter the selected sound source on the basis of the filter coefficient corresponding to the focusing zone selected by the user operation unit, and may generate the sound source signal.

The user operation unit may be a touch screen which detects the user's selection of the sound source and the focusing zone on the basis of a touch signal applied by the user.

The user operation unit may display a plurality of the focusing zones where the plurality of the sound sources and the output of the sound source are focused.

The source provider may include a CD module, a radio module, a navigation module, an AUX module, a DVD module, a DMB module, a Bluetooth module, or a USB module.

The processor may filter the sound source by using a filter coefficient which maximizes a ratio between a spatially averaged acoustic energy of the focusing zone selected by the user operation unit and a spatially averaged acoustic energy of a zone other than the selected focusing zone, and then may generate the sound source signal.

The user operation unit may include a wireless communication module. At least one of the plurality of the sound sources input from the plurality of the source providers and a selection signal for the focusing zone of the sound source may be transmitted to the processor through the wireless communication module by the user operation unit.

The user operation unit may be provided in at least one of seat zones provided in a vehicle.

Another embodiment is a vehicle audio video navigation (AVN) system including a vehicle AVN device and an external processor. The vehicle AVN device includes: a plurality of source providers which receives a sound source; a user operation unit which selects at least one of a plurality of the sound sources input from the plurality of the source providers and selects a focusing zone of the sound source; and a multi-channel amplifier. The external processor is connected to the vehicle AVN device, generates a sound source signal for focusing an output of the selected sound source on the focusing zone, and outputs the sound source signal through the multi-channel amplifier.

The external processor may filter the selected sound source on the basis of the filter coefficient corresponding to the focusing zone selected by the user operation unit, and may generate the sound source signal.

The external processor may filter the sound source by using a filter coefficient which maximizes a ratio between a spatially averaged acoustic energy of the focusing zone selected by the user operation unit and a spatially averaged acoustic energy of a zone other than the selected focusing zone, and then may generate the sound source signal.

The user operation unit may include a wireless communication module. At least one of the plurality of the sound sources input from the plurality of the source providers and a selection signal for the focusing zone of the sound source may be transmitted to the external processor through the wireless communication module by the user operation unit.

The user operation unit may be provided in at least one of seat zones provided in a vehicle.

Further another embodiment is an in-vehicle sound control method including: receiving various sound sources through a plurality of source providers; detecting at least one of the plurality of the sound sources input through the plurality of the source providers and user's selection of a focusing zone of the sound source; generating a sound source signal for focusing an output of the selected sound source on the focusing zone; and outputting the generated sound source signal.

The in-vehicle sound control method may further include displaying the plurality of the sound sources and a plurality of the focusing zones where the output of the sound source is focused.

The outputting the generated sound source signal may output simultaneously or selectively the respective sound source signals corresponding to the plurality of the sound sources.

An interior space of the vehicle is divided into a plurality of the focusing zones. The in-vehicle sound control method may further include storing a filter coefficient corresponding to each of the plurality of the focusing zones.

The generating a sound source signal may filter the sound source on the basis of the filter coefficient corresponding to the focusing zone, and may generate the sound source signal.

The filter coefficient may maximize a ratio between a spatially averaged acoustic energy of the focusing zone selected by the user operation unit and a spatially averaged acoustic energy of a zone other than the focusing zone.

Advantageous Effects

According to the in-vehicle sound control method according to the embodiment of the present invention, it is possible to individually control the focusing zone of each sound output within the vehicle, and particularly to easily select and control the focusing zone of each sound without changing the location of the speaker within the vehicle. Further, according to the in-vehicle sound control method according to the embodiment of the present invention, the sound source and the focusing zone within the vehicle can be selected and controlled only by adding an external processor without replacing the AVN device provided in the vehicle.

DESCRIPTION OF DRAWINGS

FIG. 1 is a schematic view of a system for setting a focusing zone;

FIG. 5 is a view showing a look-up table stored in a storage of the vehicle AVN system according to the embodiment of the present invention;

FIG. 9 is a flowchart of an in-vehicle sound control method according to the embodiment of the present invention.

MODE FOR INVENTION

Specific embodiments of the present invention will be described in detail with reference to the accompanying drawings. The specific embodiments shown in the accompanying drawings will be described in enough detail that those skilled in the art are able to embody the present invention. Other embodiments other than the specific embodiments are mutually different, but do not have to be mutually exclusive. Additionally, it should be understood that the following detailed description is not intended to be limited.

The detailed descriptions of the specific embodiments shown in the accompanying drawings are intended to be read in connection with the accompanying drawings, which are to be considered part of the entire written description. Any reference to direction or orientation is merely intended for convenience of description and is not intended in any way to limit the scope of the present invention.

FIG. 1 is a view schematically showing a configuration for focusing zone setting.

Figure 2A:
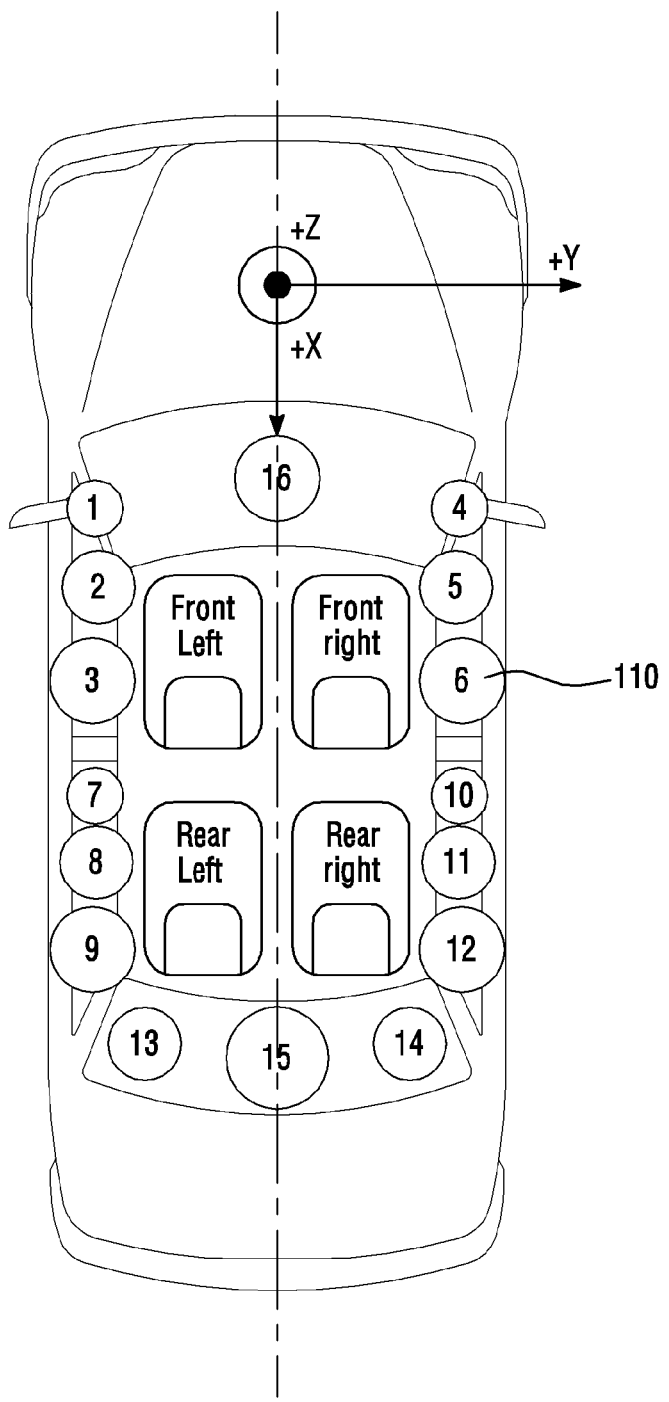
FIGS. 2a to 2c are views showing an example in which the system of FIG. 1 is implemented in a vehicle.
Figure 2B:
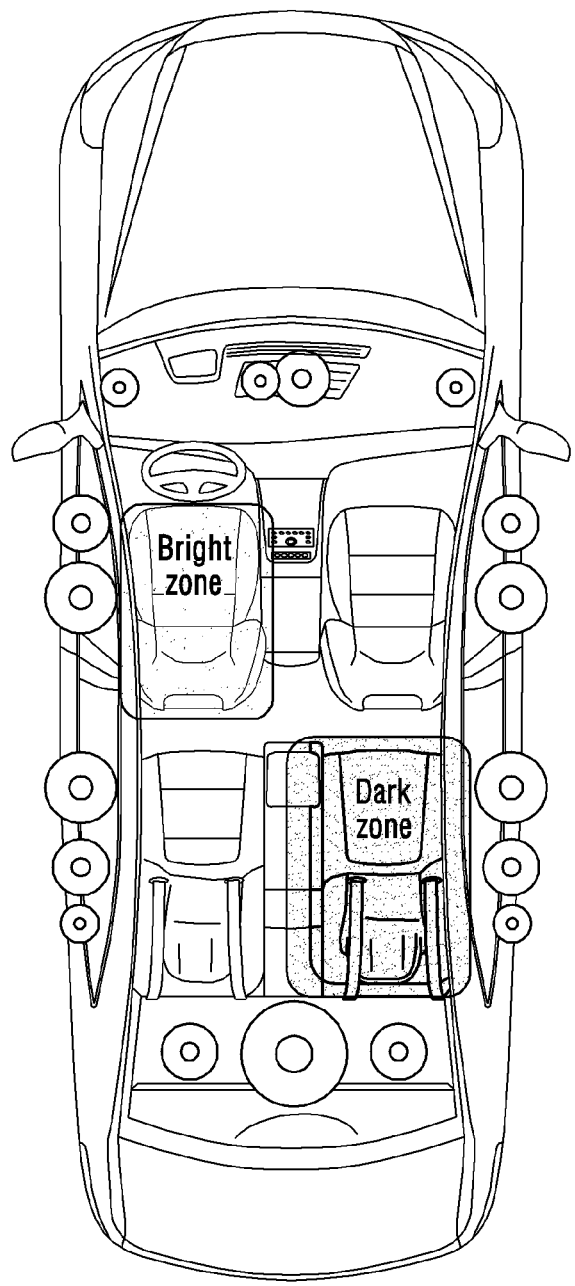
Figure 2C:
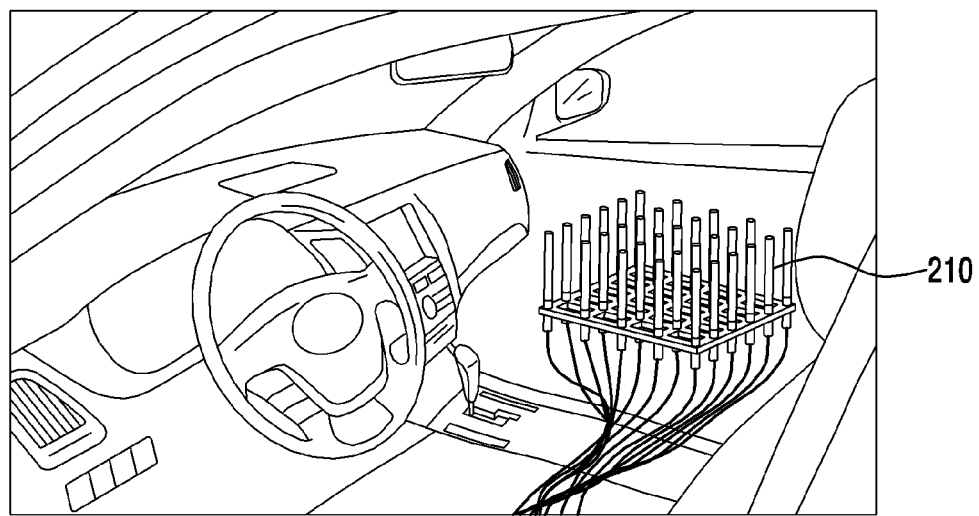

For convenience of description and understanding, FIG. 1 schematically shows a means for transfer function measurement, such as an acoustic space, a speaker 110, a microphone 210, etc. However, actually, as shown in FIGS. 2a to 2c, it is possible to measure the transfer function by using a greater number of the microphones 210 and speakers 110. Specifically, as shown in FIGS. 2a to 2c, a focusing zone setting system may be composed of a plurality of the speakers having independent channels and the microphone having 30 channels which are spaced apart from each other by an interval of 4 cm and are arranged in the form of 6×5 array. The transfer function measurement may be performed in four seat zones, that is to say, a driver seat zone (front left, FL), a passenger seat zone (front right, FR), a rear left seat zone (RL), and a rear right seat zone (RR) shown in FIG. 2a in the vehicle. However, this is just an embodiment. The setting system can be implemented in various ways in accordance with the size, internal spatial structure, location of the internal configuration, etc., of the vehicle.

Referring back to FIG. 1, in the acoustic space (herein, the interior space of the vehicle), a first speaker and a second speaker, which function as a sound source, are installed in any location. The first speaker and the second speaker do not include a bright zone (hereinafter, referred to as BZ) and a dark zone (hereinafter, referred to as DZ). However, there is no limitation to this.

The bright zone (BZ) means a zone where a sound output from the first speaker and the second speaker is heard above a threshold value. The dark zone (DZ) means a zone where a sound output from the first speaker and the second speaker is heard below the threshold value. Briefly describing, the bright zone (BZ) may be a zone where a sound can be heard and a zone where the sound source is focused by a user. The dark zone (DZ) may be a zone where a sound cannot be heard and a zone where the sound source is not focused by the user. However, the distinction between the bright zone (BZ) and the dark zone (DZ) is based on a contrast between sound pressure levels. Therefore, not only a sound may be controlled not to be heard in the dark zone (DZ), but also a small sound can be detected even in the dark zone (DZ).

In FIG. 1, the bright zone (BZ) and the dark zone (DZ) are schematized and distinguished by a dotted circle.

The sound pressure $p(\vec{r}_j | \vec{r}_{s,i}; \omega)$ (a signal which is sensed by the microphone) at any point $\vec{r}_j$ generated by a first sound source and a second sound source can be represented by the following Equation 1.

$$p(\vec{r}_j | \vec{r}_{S,i}; \omega) = \sum_{i=1}^{2} G(\vec{r}_j | \vec{r}_{S,i}; \omega) q(\vec{r}_{S,i}; \omega),$$ Equation 1 where $\vec{r}_j$ represents a j-th spatial point, and $\vec{r}_{s,i}$ represents a location of an i-th sound source. Additionally, $G(\vec{r}_j | \vec{r}_{s,i}; \omega)$ is a transfer function representing a relation between $\vec{r}_j$ and $\vec{r}_{s,i}$. Here, the transfer function may be easily obtained by a definition of a mathematical model or an actual measurement. Equation (1) may be represented with respect to two points in the form of a matrix by the following Equation (2).

$$\begin{bmatrix} p(\vec{r}_1; \omega) \\ p(\vec{r}_2; \omega) \end{bmatrix} = \begin{bmatrix} G(\vec{r}_1 | \vec{r}_{s1}; \omega) & G(\vec{r}_1 | \vec{r}_{s2}; \omega) \\ G(\vec{r}_2 | \vec{r}_{s1}; \omega) & G(\vec{r}_2 | \vec{r}_{s2}; \omega) \end{bmatrix} p = Gq$$ Equation (2)

Likewise, a first bright zone (BZ1), a second bright zone (BZ2), the dark zone (DZ), and a total sound zone (TZ) including the two foregoing zones are represented in the form of a matrix by the following Equations (3) to (5). The subscripts b, d, and t in Equations (3) to (5) represent the bright zone (BZ), the dark zone (DZ), and the total sound zone (TZ) respectively.

$$\begin{bmatrix} p(\vec{r}_{b1}; \omega) \\ p(\vec{r}_{b2}; \omega) \\ p(\vec{r}_{b3}; \omega) \\ p(\vec{r}_{b4}; \omega) \end{bmatrix} = \begin{bmatrix} G(\vec{r}_{b1} | \vec{r}_{s1}; \omega) & G(\vec{r}_{b1} | \vec{r}_{s2}; \omega) \\ G(\vec{r}_{b2} | \vec{r}_{s1}; \omega) & G(\vec{r}_{b2} | \vec{r}_{s2}; \omega) \\ G(\vec{r}_{b3} | \vec{r}_{s3}; \omega) & G(\vec{r}_{b3} | \vec{r}_{s4}; \omega) \\ G(\vec{r}_{b4} | \vec{r}_{s3}; \omega) & G(\vec{r}_{b4} | \vec{r}_{s4}; \omega) \end{bmatrix} \begin{bmatrix} q(\vec{r}_{s1}; \omega) \\ q(\vec{r}_{s2}; \omega) \end{bmatrix} p_b =$$ Equation (3)

$$G_b q$$

$$\begin{bmatrix} p(\vec{r}_{d1}; \omega) \\ p(\vec{r}_{d2}; \omega) \end{bmatrix} = \begin{bmatrix} G(\vec{r}_{d1} | \vec{r}_{s1}; \omega) & G(\vec{r}_{d1} | \vec{r}_{s2}; \omega) \\ G(\vec{r}_{d2} | \vec{r}_{s1}; \omega) & G(\vec{r}_{d2} | \vec{r}_{s2}; \omega) \end{bmatrix} \begin{bmatrix} q(\vec{r}_{s1}; \omega) \\ q(\vec{r}_{s2}; \omega) \end{bmatrix} p_d =$$ Equation (4)

$$G_b q$$

$$\begin{bmatrix} p(\vec{r}_{b1}; \omega) \\ p(\vec{r}_{b2}; \omega) \\ p(\vec{r}_{b3}; \omega) \\ p(\vec{r}_{b4}; \omega) \\ p(\vec{r}_{d1}; \omega) \\ p(\vec{r}_{d2}; \omega) \end{bmatrix} = \begin{bmatrix} G(\vec{r}_{b1} | \vec{r}_{s1}; \omega) & G(\vec{r}_{b1} | \vec{r}_{s2}; \omega) \\ G(\vec{r}_{b2} | \vec{r}_{s1}; \omega) & G(\vec{r}_{b2} | \vec{r}_{s2}; \omega) \\ G(\vec{r}_{b3} | \vec{r}_{s3}; \omega) & G(\vec{r}_{b3} | \vec{r}_{s4}; \omega) \\ G(\vec{r}_{b4} | \vec{r}_{s3}; \omega) & G(\vec{r}_{b4} | \vec{r}_{s4}; \omega) \\ G(\vec{r}_{d1} | \vec{r}_{s1}; \omega) & G(\vec{r}_{d1} | \vec{r}_{s2}; \omega) \\ G(\vec{r}_{d2} | \vec{r}_{s1}; \omega) & G(\vec{r}_{d2} | \vec{r}_{s2}; \omega) \end{bmatrix} \begin{bmatrix} q(\vec{r}_{s1}; \omega) \\ q(\vec{r}_{s2}; \omega) \end{bmatrix} p_t =$$ Equation (5)

$$G_t q$$

In the next place, a variable representative of the space is defined as a spatially averaged acoustic energy in the embodiment of the present invention. The variable may be represented by the following Equation (6).

$$e = \frac{1}{2} p * p = q^H \left(\frac{1}{2} G^H G\right) q = q^H R q \qquad \text{Equation (6)}$$

The variable representative of the space is defined as the spatially averaged acoustic energy because it is difficult to express acoustic characteristics within a zone only by the sound pressure levels themselves of the respective points. In other words, in the embodiment of the present invention, it is considered that the spatially averaged acoustic potential energy of the bright zone (BZ), the spatially averaged acoustic energy of the dark zone (DZ), and the spatially averaged acoustic potential energy of the total sound zone (TZ) are sound pressure levels of each zone.

In Equation (6), the matrix is defined as a correlation matrix which indicates how much interference each sound source causes in a defined zone. The figure of 2 means the number of the microphones 210 in Equation (2) (see FIG. 1). For convenience of understanding, the embodiment of the present invention takes a simple example. However, actually, the numeric means the number of the microphones included within a defined zone.

Namely, when 30 microphones are used as shown in FIG. 2c, the figure of 2 would be changed into 30. It is possible to represent the spatially averaged acoustic energy for the bright zone (BZ) and the dark zone (DZ), which is defined by this logic.

$$e_b = q^H R_b q \qquad \text{Equation (7)}$$

$$e_d = q^H R_d q \qquad \text{Equation (8)}$$

$$e_t = q^H R_t q \qquad \text{Equation (9)}$$

Next, provided is a description of each of processes of generating a first sound source signal and a second sound source signal which are required so as to obtain a required control effect by using the sound pressure level of each zone, which is defined in Equations (7) to (9).

1. Determination of the Sound Source Signal for Maximizing the Contrast Between the Sound Pressure Level and Total Magnitude of the Sound Input in the Bright Zone (BZ)

The total magnitude of the input is defined as a sum of the absolute value of complex magnitude of the first sound source signal and the absolute value of complex magnitude of the second sound source signal. This can be referred to as a total magnitude of control effort. The total magnitude of input is represented by the following Equation (10).

$$\text{total magnitude of input} = |G_0|^2 q^H q \qquad \text{Equation (10)}$$

Here, $|G_0|^2$ is the total magnitude of the input, that is to say, a normalizing constant which changes the control effort into the dimension of the spatially averaged acoustic energy.

The contrast between the sound pressure level and the total magnitude of the input in the bright zone (BZ) can be represented as the following Equation (11) by using the Equations (7) and (10). This is defined as "acoustic brightness".

$$\alpha = \frac{q^H R_a q}{|G_0|^2 q^H q} \qquad \text{Equation (11)}$$

Accordingly, the determination of the sound source signal for maximizing the contrast between the sound pressure level and the total magnitude of the input in the bright zone (BZ) corresponds to how to obtain the sound source signal for maximizing the value of α in the Equation (11).

The Equation (11) can be formalized as a mathematical problem of maximizing Reyleigh quotient α. This is represented by the following Equation (12).

$$R_b q = \alpha |G_0|^2 q \qquad \text{Equation (12)}$$

As shown in the Equation (12), the obtaining of the sound source signal for maximizing the value of a is equal to the obtaining of a maximum eigenvalue of a generalized eigenvalue problem. Also, an eigenvector corresponding to the maximum eigenvalue becomes the first sound source signal and the second sound source signal.

2. Determination of the Input Signal for Maximizing the Contrast Between the Bright Zone (BZ) and the Dark Zone (DZ)

The input signal of the sound source for maximizing the contrast between the sound pressure level of the bright zone (BZ) and the sound pressure level of the dark zone (DZ) is considered. As with the case 1 (Determination of the sound source signal for maximizing the contrast between the sound pressure level of the bright zone (BZ) and total magnitude of the sound input), the sound pressure level of the bright zone (BZ) with respect to that of the dark zone (DZ) can be mathematically represented by the following Equation (13). This is defined as "acoustic contrast 1".

$$\beta = \frac{q^H R_b q}{q^H R_d q} \qquad \text{Equation (13)}$$

$$R_d^{-1} R_b q = \beta q \qquad \text{Equation (14)}$$

In the same manner as described above, the Equation (13) can be formalized as a problem of maximizing Reyleigh quotient β. As shown in the Equation (14), the obtaining of the sound source signal for maximizing the value of β is equal to the obtaining of a maximum eigenvalue of a generalized eigenvalue problem. Also, an eigenvector corresponding to the maximum eigenvalue becomes the first sound source signal and the second sound source signal.

Therefore, while the conventional methods use the relation between a listener and the sound source in a limited form, the embodiment of the present invention uses a method for obtaining an optimized sound source control signal by analyzing all the transfer functions.

As a result, unlike an active noise control method which only decreases the sound pressure level, the embodiment of the present invention is able to increase a relative difference of the sound pressure level in accordance with the zone. In other words, it is possible to perform control to increase the acoustic contrast between two different zones as well as the magnitude of the sound pressure level corresponding to the acoustic brightness.

3. Determination of the Input Signal for Maximizing the Contrast Between the Sound Pressure Level of the Bright Zone (BZ) and the Sound Pressure Level of the Total Sound Zone (TZ)

The sound source input signal for maximizing the contrast between the sound pressure level of the bright zone (BZ) and the sound pressure level of the total sound zone (TZ) will be described. As with the case 2 (Determination of the input signal for maximizing the contrast between the bright zone (BZ) and the dark zone (DZ)), the sound pressure level of the total sound zone (TZ) with respect to that of the dark zone (DZ) can be mathematically represented by the following Equation (15). This is defined as "acoustic contrast 2".

$$\beta' = \frac{q^H R_b q}{q^H R_t q} \quad \text{Equation (15)}$$

$$R_t^{-1} R_b q = \beta'_q \quad \text{Equation (16)}$$

In the same manner as described above, the Equation (15) can be formalized as a problem of maximizing Reyleigh quotient β'. As shown in the Equation (16), the obtaining of the sound source signal for maximizing the value of β' is equal to the obtaining of a maximum eigenvalue of a generalized eigenvalue problem. Also, an eigenvector corresponding to the maximum eigenvalue becomes the first sound source signal and the second sound source signal.

4. Method for Providing an Independent Acoustic Environment to a Plurality of the Bright Zones (BZ)

Three kinds of methods for providing an independent acoustic environment to a plurality of the bright zones (BZ) will be described.

[Method 1] In the first bright zone (BZ1), a ratio between the spatially averaged acoustic energy by the first sound source signal and a sum of the energies of the first sound source signal is intended to be maximized Additionally, in the second bright zone (BZ2), a ratio between the spatially averaged acoustic energy by the second sound source signal and a sum of the energies of the second sound source signal is intended to be maximized.

In this case, the input signal is generated differently for each bright zone. This is represented as follows.

$$\alpha_{(1)} = \frac{q_{(1)}^H R_{b(1)} q_{(1)}}{q_{(1)}^H q_{(1)}} \quad \text{Equation (17)}$$

$$\alpha_{(2)} = \frac{q_{(2)}^H R_{b(2)} q_{(2)}}{q_{(2)}^H q_{(2)}} \quad \text{Equation (18)}$$

[Method 2] In the first bright zone (BZ1), a ratio between the spatially averaged acoustic energy by the first sound source signal and the spatially averaged acoustic energy of remaining zone other than the first bright zone (BZ1) is intended to be maximized Simultaneously, in the second bright zone (BZ2), a ratio between the spatially averaged acoustic energy by the second sound source signal and the spatially averaged acoustic energy of remaining zone other than the second bright zone (BZ2) is intended to be maximized.

In this case, the input signal is generated differently for each bright zone (BZ). This is represented as follows.

$$\beta_{(1)} = \frac{q_{(1)}^H R_{b(1)} q_{(1)}}{q_{(1)}^H R_{d(1)} q_{(1)}} \quad \text{Equation (19)}$$

$$\beta_{(2)} = \frac{q_{(2)}^H R_{b(2)} q_{(2)}}{q_{(2)}^H R_{d(2)} q_{(2)}} \quad \text{Equation (20)}$$

[Method 3] When a plurality of the bright zones (BZ) are provided, a ratio between the spatially averaged acoustic energy by the first sound source signal and the spatially averaged acoustic energy of the total zone including the first bright zone (BZ1) is intended to be maximized in the first bright zone (BZ1). Simultaneously, a ratio between the spatially averaged acoustic energy by the second sound source signal and the spatially averaged acoustic energy of the total zone including the second bright zone (BZ2) is intended to be maximized in the second bright zone (BZ2).

In this case, the input signal is generated differently for each bright zone (BZ). This is represented as follows.

$$\beta'_{(1)} = \frac{q_{(1)}^H R_{b(1)} q_{(1)}}{q_{(1)}^H R_t q_{(1)}} \quad \text{Equation (21)}$$

$$\beta'_{(2)} = \frac{q_{(2)}^H R_{b(2)} q_{(2)}}{q_{(2)}^H R_t q_{(2)}} \quad \text{Equation (22)}$$

In the above-described methods, the input signal is generated differently for each bright zone (BZ). The signal input to the first sound source and the second sound source is commonly expressed by the following Equation (23).

$$\begin{bmatrix} q(\vec{r}_{s1}; \omega) \\ q(\vec{r}_{s2}; \omega) \end{bmatrix} = x_1(\omega) \begin{bmatrix} q_{(1)}(\vec{r}_{s1}; \omega) \\ q_{(1)}(\vec{r}_{s2}; \omega) \end{bmatrix} + x_2(\omega) \begin{bmatrix} q_{(2)}(\vec{r}_{s1}; \omega) \\ q_{(2)}(\vec{r}_{s2}; \omega) \end{bmatrix} q = \quad \text{Equation (23)}$$

$$q_{(1)} x_1(\omega) + q_{(2)} x_2(\omega)$$

In this case, it is possible to create a plurality of independent acoustic environments in which a reproduced sound by the first input signal exists in the first bright zone (BZ1) and a reproduced sound by the second input signal exists in the second bright zone (BZ2).

In summary of the theoretical foregoing, while the conventional methods use the relation between a listener and the sound source in a limited form, the embodiment of the present invention uses a method for obtaining an optimized sound source signal by analyzing all the transfer functions.

As a result, unlike an active noise control method which only decreases the sound pressure level, the embodiment of the present invention increases a relative difference of the sound pressure level in accordance with the zone in the acoustic space. In other words, the embodiment of the present invention performs control to increase the acoustic contrast between two different zones as well as the magnitude of the sound pressure level corresponding to the acoustic brightness.

The method for forming the bright zone (BZ) and the dark zone (DZ) will be described in more detail with greater reference to FIG. 3.

As shown in FIG. 1, the configuration which measures the transfer function and sets the focusing zone includes a sound source 100, a sensor 200, a signal generator 300, and a signal analyzer 400.

The sound source 100 includes a plurality of the speakers 110 corresponding to a plurality of the sound sources and a multi-channel audio amplifier 120 which drives the plurality of the speakers. The sensor 200 includes a plurality of the microphones 210 installed in the bright zone (BZ) and the dark zone (DZ). The signal generator 300 includes a multi-channel signal generator 310 which gives a synchronized individual sound source signal to each speaker through the multi-channel audio amplifier of the sound source. The signal analyzer 400 includes a multi-channel signal analyzer 410 which measures a transfer function between a sound source signal q input to the sound source 100 and a sound signal p sensed by the sensor 200, determines an appropriate sound source signal, and then transmits the information on the determined sound source signal to the multi-channel signal generator 310 of the signal generator 300.

Here, the appropriate sound source signal maximizes the acoustic brightness $\alpha_{(1)}, \alpha_{(2)}$ of Equations 17 and 18 (acoustic brightness control), maximizes the acoustic contrast 1 of $\beta_{(1)}, \beta_{(2)}$ Equations 19 and 20 (acoustic contrast 1 control) or maximizes the acoustic contrast 2 $\beta'_{(1)}, \beta'_{(2)}$ of Equations 21 and 22 (acoustic contrast 2 control). Also, the thus determined sound source signal corresponds to a control sound source signal which is a term used in the claims of the present invention.

Figure 3:
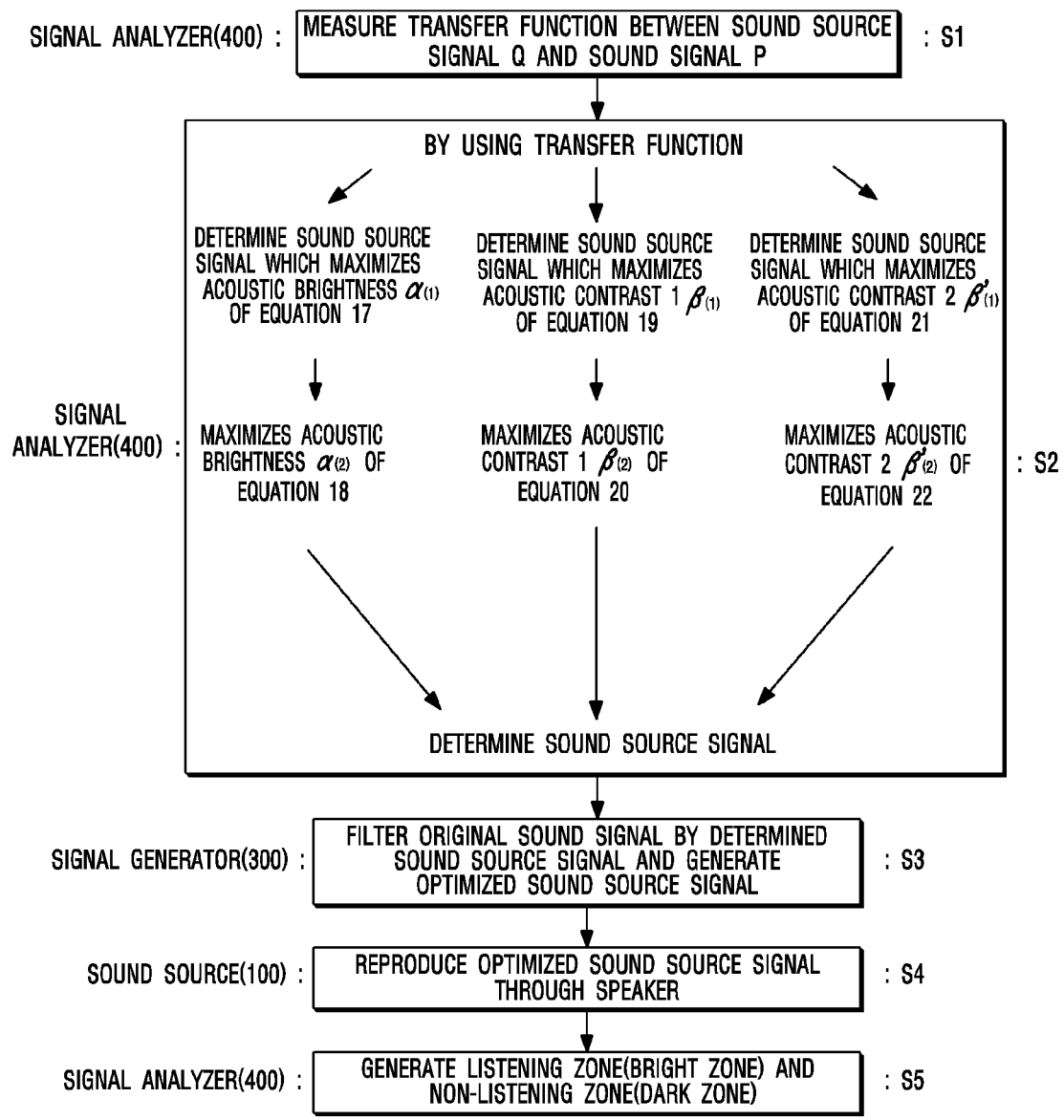
FIG. 3 is a flowchart for describing a method for setting a bright zone (BZ), i.e., the focusing zone and a dark zone (DZ), i.e., a zone other than the bright zone (BZ)

Referring to FIG. 3, the signal analyzer 400 measures the transfer function between the sound source signal of the sound source 100 and the sound signal of the sensor 200 (Step S1). In the measurement of the transfer function, a large amount of measurement are required according to the number of the speakers and the number of the microphones. Therefore, the transfer function can be easily measured by the following simple method which is used generally.

The simple method is to input, as a sound source signal, white noise with no correlation to the plurality of the speakers and is to separate the contribution of each sound source from the sound signal sensed by each microphone, so that the transfer function between the sound source signal of the sound source and the sound signal of the sensor is measured by only one measurement.

Next, the signal analyzer 400 determines an appropriate sound source signal by using the transfer function measured in step S1 and transmits the information on the determined sound source signal to the signal generator 300 (Step S2).

Here, the appropriate sound source signal maximizes the acoustic brightness $\alpha_{(1)}, \alpha_{(2)}$ of Equations 17 and 18 (acoustic brightness control), maximizes the acoustic contrast 1 $\beta_{(1)}, \beta_{(2)}$ of Equations 19 and 20 (acoustic contrast 1 control) or maximizes the acoustic contrast 2 $\beta'_{(1)}, \beta'_{(2)}$ of Equations 21 and 22 (acoustic contrast 2 control). Also, the thus determined sound source signal corresponds to a control sound source signal which is a term used in the claims of the present invention.

Here, a single frequency has been described. Furthermore, in the case of a plurality of frequencies, it can be understood that the sound source signal for each frequency is determined. Also, the sound source signal determined herein functions as a filter coefficient which filters an original sound signal (any sound intended to be heard in the bright zone (BZ)) in a below-described step 3.

Next, the signal generator 300 filters the original sound signal by the sound source signal determined in step 2 on the basis of the information transmitted from the signal analyzer 400, generates a sound source signal (filtered sound source signal) optimized for the bright zone (BZ), that is, generates a control sound source signal, and then transmits to the sound source 100 (Step S3).

Here, a single frequency has been described. Furthermore, in the case of a plurality of frequencies, it can be understood that, for each frequency, the original sound signal is filtered by the determined sound source signal and a sound source signal optimized for the bright zone (BZ), that is, a control sound source signal is generated.

Next, the sound source 100 outputs the sound source signal optimized by the signal generator 300 through the amplifier and speakers (Step S4). Accordingly, the bright zone (BZ) and the dark zone (DZ) may be generated in the acoustic space (Step S5).

The acoustic brightness control allows the bright zone (BZ) to obtain the maximum sound pressure level with respect to the same input magnitude. Therefore, when the input magnitude cannot be increased or when the input magnitude is limited, the acoustic brightness control is more useful.

However, the acoustic brightness control has a disadvantage in that the amount of the sound is relatively greater than those of the acoustic contrast 1 control and the acoustic contrast 2 control in a zone other than the bright zone (BZ). Therefore, when the amount of the sound doesn't have to be very small in a zone other than the bright zone (BZ), the acoustic brightness control is more efficient and effective.

As long as the input magnitude is not extremely limited, the acoustic contrast 1 control and the acoustic contrast 2 control shows a bright zone (BZ) production result more excellent than that of the acoustic brightness control. Also, for all small, medium, and large sound reproducing apparatuses, the acoustic contrast 1 control and the acoustic contrast 2 control are more excellent than the acoustic brightness control because the amount of the sound becomes very small in a zone other than the bright zone (BZ).

Hereinafter, a vehicle AVN system 1000 capable of selecting a plurality of the sound sources and of individually setting the focusing zone (i.e., the location of the bright zone (BZ)) of each of the selected sound sources will be described on the basis of the above-described generation principle of the bright zone (BZ).

Figure 4A:
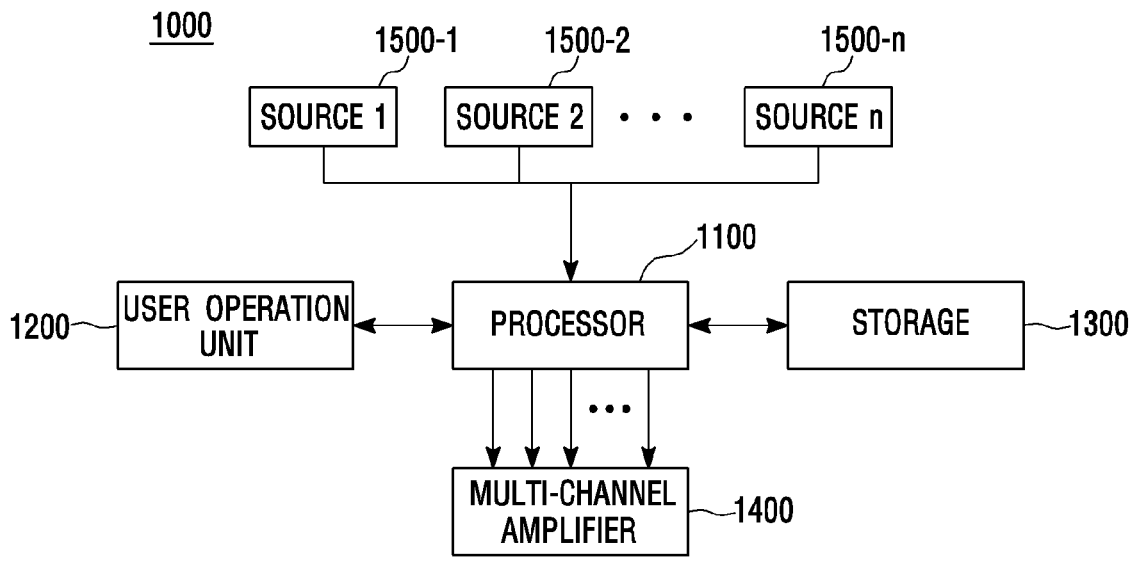
FIG. 4a is a block diagram showing a configuration of a vehicle AVN system according to an embodiment of the present invention.

FIG. 4a is a block diagram showing a configuration of the vehicle AVN system 1000 according to the embodiment of the present invention. The vehicle AVN system 1000 according to the embodiment of the present invention includes a processor 1100, a user operation unit 1200, a storage 1300, a multi-channel amplifier 1400, and source providers 1500-1 to 1500-n.

First, the source providers 1500-1 to 1500-n have a function of receiving the sound source. The source providers 1500-1 to 1500-n may include, for example, at least one of sound source input modules such as a CD module, a radio module, a navigation module, an AUX module, a DVD module, a DMB module, a Bluetooth module, or a USB module.

The user operation unit 1200 has a function of receiving the selection of a sound source to be output through the speaker provided in the vehicle among the n number of the sound sources input from the source providers 1500-1 to 1500-n. Besides, the user operation unit 1200 has a function of receiving the selection of the focusing zone (corresponding to the above-described bright zone (BZ)) where the output of the selected sound source is focused.

The user operation unit 1200 may be implemented by a means such as a touch screen, etc., may display the type of the sound source input from the source providers 1500-1 to 1500-n in the form of text, image, or icon, and may display a zone where the output of the sound source is focused, thereby allowing the user to easily select the sound source and focusing zone. Also, in another embodiment, the user operation unit 1200 may be implemented by a means such as a jog-shuttle, a switch, a button, or the like included in the AVN device in the vehicle.

Meanwhile, the user operation unit 1200 may be implemented by a separate operation means excluded from the AVN device in the vehicle. For example, the user operation unit 1200 may be an operation means which is connected to the AVN device in the vehicle in a wired or wireless manner.

Figure 4B:
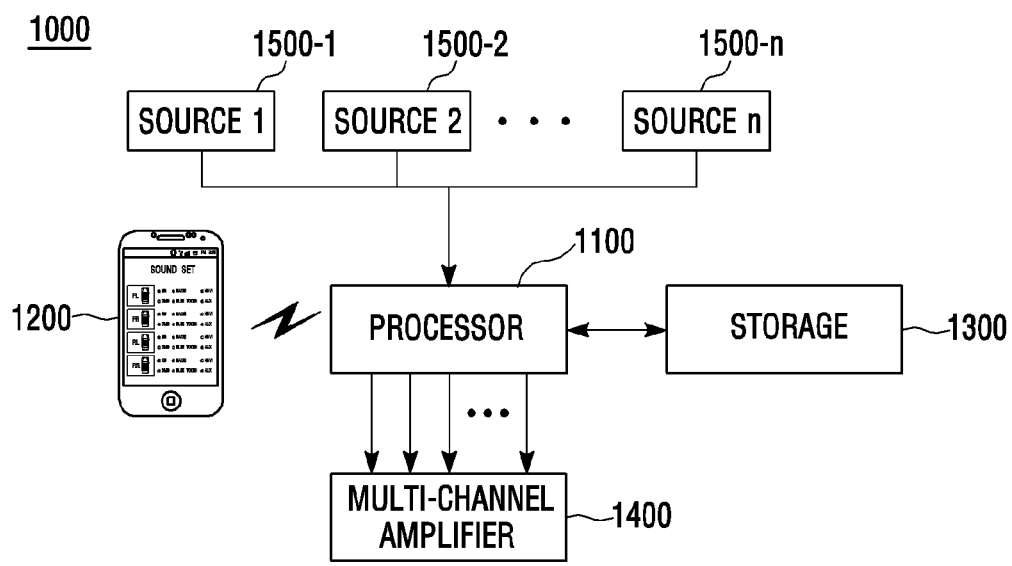
FIG. 4b is a block diagram showing a configuration of a vehicle AVN system according to another embodiment of the present invention.

FIG. 4b shows an embodiment where the user operation unit 1200 is implemented by a smartphone. The user operation unit 1200 implemented by a smartphone may be connected to the processor 1100 in a wireless manner and may use various communication methods such as WiFi, Bluetooth, ZigBee, Near Field Communication (NFC), etc. Therefore, the user operation unit 1200 and the processor 1100 may include a wireless communication module respectively.

The sound source and the focusing zone which have been selected by the wirelessly connected user operation unit 1200 are transmitted to the processor 1100. The processor 110 may be used to control the sound in the vehicle on the basis of the signal received from the user operation unit 1200.

The user operation unit 1200 may be implemented by a wirelessly connected operation means, for example, a variety of mobile terminals, a remote controller using an infrared signal, etc., as well as the smartphone. The user operation unit 1200 may be also implemented by a wired operation means. For example, the user operation unit 1200 may be a jog-shuttle, a switch, a button, etc., which are provided in a steering wheel of the vehicle or may be an operation means separately provided on the seat zone (each seat armrest, door wall, rear side of the driver seat, rear side of the passenger seat, console box, etc.) in the vehicle, on the head lining, on the center fascia, on the dashboard, etc.

The processor 1100 has a function of generating the sound source signal on the basis of the sound source and the focusing zone selected by the user operation unit 1200. In other words, the processor 1100 functions as the signal analyzer 400 and the signal generator 300 which have been described with reference to FIG. 3. That is, the processor 1100 filters the sound source selected by the user by using the filter coefficient which maximizes a ratio between the spatially averaged acoustic energy of the focusing zone selected by the user and the spatially averaged acoustic energy of a zone other than the focusing zone, and then generates the sound source signal.

The storage 1300 stores the filter coefficient for generating the sound source signal. That is, the storage 1300 stores the filter coefficient calculated by the method described with reference to FIGS. 1 and 2a to 2c. For example, the storage 1300 may store the filter coefficient in the form of a look-up table shown in FIG. 5. Here, the interior space of the vehicle may be divided into a plurality of zones where the output of the sound source can be focused. The filter coefficient corresponding to the plurality of the divided zones, for example, a driver seat zone (FL), a passenger seat zone (FR), a rear left seat zone (RL), and a rear right seat zone (RR) may be defined in the look-up table.

As shown in FIG. 5, the focusing zone and the filter coefficient corresponding to the focusing zone are stored in the look-up table stored in the storage 1300. When the first sound source 1500-1 is focused on the driver seat zone (FL), that is to say, when the bright zone (BZ) for the first sound source 1500-1 is set to the driver seat zone (FL), the processor 1100 filters the first sound source 1500-1 on the basis of the filter coefficient 1 (FC1) and then generates the sound source signal.

When the second sound source 1500-2 is focused on the driver seat zone (FL) and the passenger seat zone (FR), that is to say, when the bright zone (BZ) for the second sound source 1500-2 is set to the driver seat zone (FL) and the passenger seat zone (FR), the processor 1100 filters the second sound source 1500-2 on the basis of the filter coefficient 5 (FC5) and then generates the sound source signal. However, the storage method of the storage 1300 is not limited to the look-up table of FIG. 5. The storage 1300 may store the filter coefficient by using various methods.

The multi-channel amplifier 1400 has a function of dividing the generated sound source signal into multi-channels and amplifying, and then outputting. The multi-channel amplifier 1400 may simultaneously or selectively output the sound source signal corresponding to each of the sound sources.

For example, in a case where all the seat zones (FL, FR, RL, and RR) are set to the focusing zone by applying the filter coefficient 8 (FC8) to the first sound source 1500-1 and only the driver seat zone (FL) is set to the focusing zone by applying the filter coefficient 1 (FC1) to the second sound source 1500-2, when the multi-channel amplifier 1400 simultaneously outputs the filtered sound source signals respectively, all of the first sound source 1500-1 and second sound source 1500-2 can be heard in the driver seat zone (FL) and only the first sound source 1500-1 can be heard in the other zones. Specifically, if the first sound source 1500-1 is a music sound and the second sound source 1500-2 is a navigation sound, the music can be appreciated in a zone other than the driver seat zone (FL) without interference caused by the navigation sound.

Also, the user may select the sound source signal to be output through the multi-channel amplifier 1400 by using the user operation unit 1200. When a specific sound source signal is selected, the sound source signal can be heard only in the focusing zone corresponding to the specific sound source signal. For example, in a case where the focusing zones of the music sound and the navigation sound are set to the driver seat zone (FL), when the driver wants to focus on the navigation sound, only the navigation sound can be selectively output by operating the user operation unit 1200.

Figure 6:
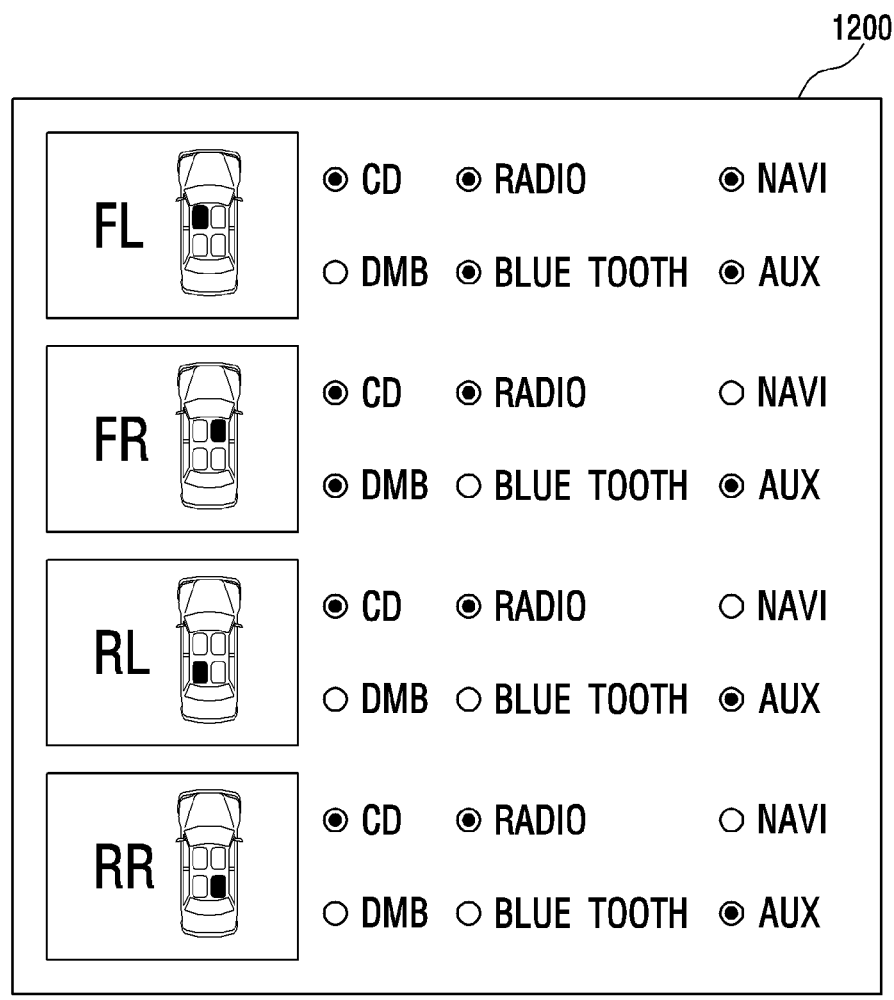
FIG. 6 is a view showing a user operation unit of the vehicle AVN system according to the embodiment of the present invention.

FIG. 6 is a view showing the user operation unit 1200 of the vehicle AVN system 1000 according to the embodiment of the present invention. The user operation unit 1200 may be a touch screen equipped with a display (not shown) and a touch panel (not shown). A plurality of zones where the sound source input from the source providers 1500-1 to 1500-*n* and the output of the sound source are focused are displayed on the display (not shown) in the form of text, image or icon, etc. The user may select the sound source or the focusing zone while viewing the text, image, or icon, etc., displayed on the display. That is, when the user touches the display (not shown), the touch panel (not shown) detects the user's selection of the sound source and the focusing zone on the basis of a touch signal of the user.

In the embodiment of FIG. 6, the user operation unit 1200 displays the focusing zone on the left side thereof and displays the plurality of the sound sources on the right side thereof. The plurality of the sound sources may be displayed in the form of a radio button. The user may select the sound source to be output in each of the focusing zones. That is, the touch panel (not shown) of the user operation unit 1200 may detect the position of the touch applied by the user and determine the user's selection of the sound source and the focusing zone.

Referring to FIG. 6, a sound to be input through CD, radio, navigation, Bluetooth, and AUX terminal is selected as the sound source to be focused on the driver seat zone (FL). A sound to be input through CD, radio, DMB, and AUX terminal is selected as the sound source to be focused on the passenger seat zone (FR). A sound to be input through CD, radio, and AUX terminal is selected as the sound source to be focused on the rear left seat zone (RL) and the rear right seat zone (RR). When the focusing zone is set as shown in FIG. 6, a call voice and navigation sound through Bluetooth are heard only by a driver who is located in the driver seat zone (FL) and a DMB sound is heard only by a passenger who is located in the passenger seat zone (FR).

Figure 7A:
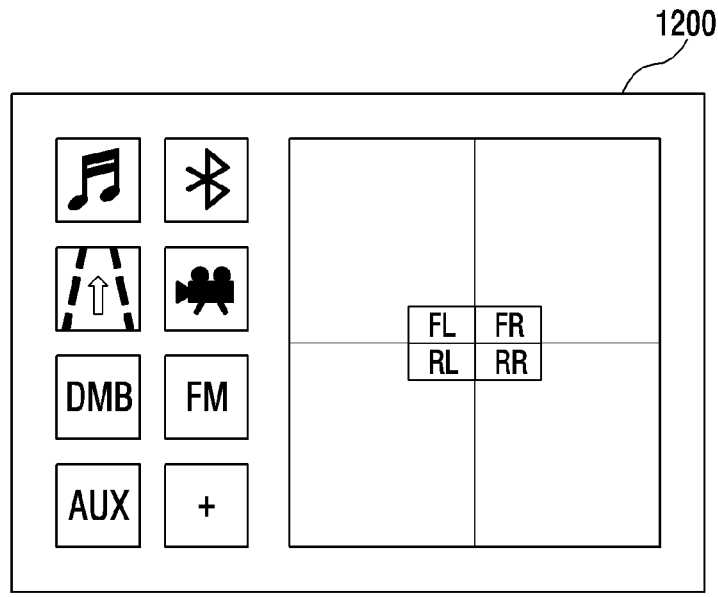
FIGS. 7a to 7c are views showing a user operation unit of a vehicle AVN system according to another embodiment of the present invention.
Figure 7B:
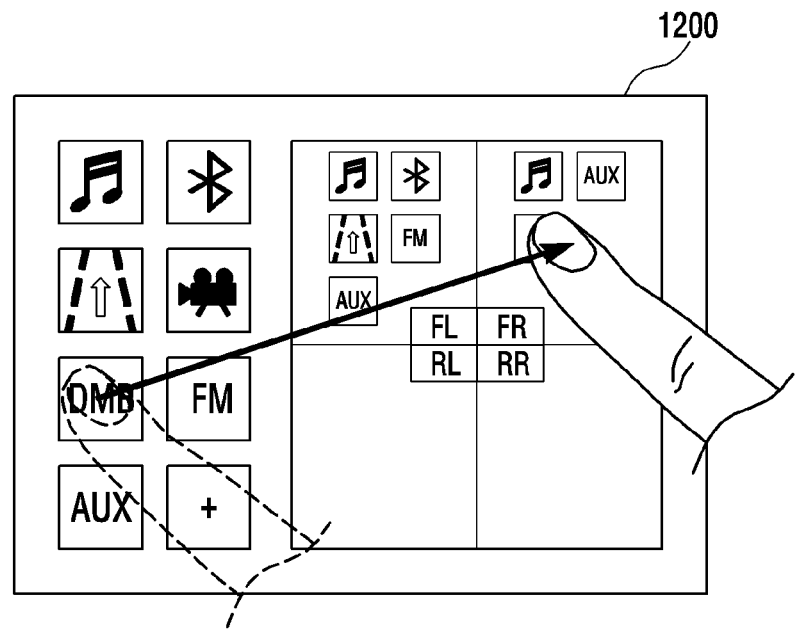
Figure 7C:
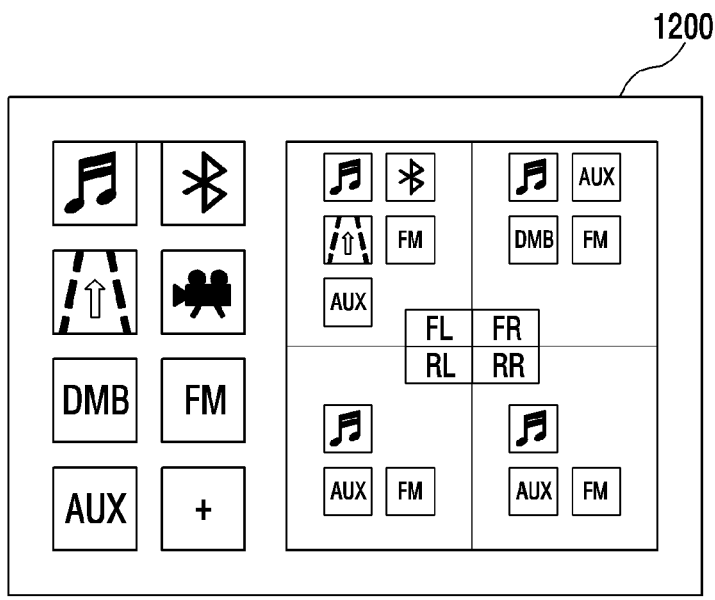

FIGS. 7a to 7c are views showing the user operation unit 1200 of the vehicle AVN system 1000 according to another embodiment of the present invention.

As shown in FIG. 7a, the user operation unit 1200 may display the plurality of the sound sources on the left side thereof and the focusing zone on the right side thereof. The plurality of the sound sources may be input from a plurality of the source providers such as a CD module, a Bluetooth module, a navigation module, a DVD module, a DMB module, a radio module, and an AUX module. The user may select a larger number of the sound sources if necessary. The focusing zone may be, as described above, divided into the driver seat zone (FL), the passenger seat zone (FR), the rear left seat zone (RL), and the rear right seat zone (RR). However, there is no limitation to this. The focusing zone may be divided into a smaller or larger number of zones than this.

As shown in FIGS. 7b and 7c, the user may set the focusing zone by dragging one of the sound sources displayed on the left side of the user operation unit 1200 to one of the focusing zones displayed on the right side of the user operation unit 1200. As with the embodiment shown in FIG. 6, the plurality of the sound sources may be selected for one focusing zone. On the contrary to this, one sound source may be set for a plurality of the focusing zones.

When the setting of the sound source and the focusing zone is, as shown in FIG. 7c, completed in this way, a CD sound, an AUX sound, a navigation sound, a FM sound, and a Bluetooth sound are focused on the driver seat zone (FL), a CD sound, an AUX sound, a DMB sound, and a FM sound are focused on the passenger seat zone (FR), and only a CD sound, an AUX sound, and a FM sound are focused on the rear left seat zone (RL) and the rear right seat zone (RR).

The user is able to very easily set the sound source and the focusing zone in various ways described above. Also, as described above, the user is able to selectively turn on/off the output of each sound source by operating the user operation unit 1200.

Figure 8A:
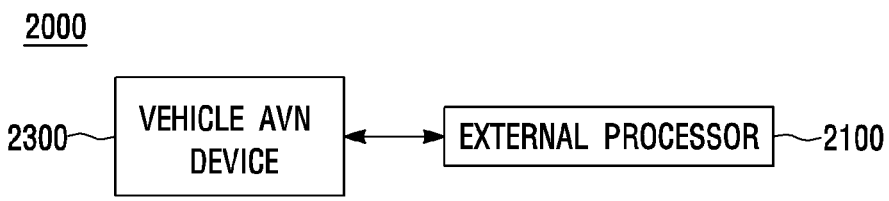
FIG. 8a is a block diagram showing a configuration of the vehicle AVN system according to further another embodiment of the present invention.

FIG. 8a is a block diagram showing a configuration of a vehicle AVN system 2000 according to another embodiment of the present invention. The vehicle AVN system 2000 shown in FIG. 8a includes a vehicle AVN device 2300 and an external processor 2100. Unlike the vehicle AVN system 1000 shown in FIG. 4a, the vehicle AVN system 2000 shown in FIG. 8a includes the external processor.

The vehicle AVN device 2300 may include a plurality of the source providers for receiving the sound source, include the user operation unit which allows the user to select at least one of a plurality of the sound sources input from the plurality of the source providers and to select the focusing zone of the sound source, and include the multi-channel amplifier.

The external processor 2100 is connected to the vehicle AVN device 2300 in a wired or wireless manner and generates the sound source signal for focusing the output of the selected sound source on the focusing zone, and then outputs the sound source signal through the multi-channel amplifier.

Here, as described above, the external processor 2100 filters the selected sound source on the basis of the filter coefficient corresponding to the focusing zone selected by the user operation unit, and then generates the sound source signal.

Additionally, as described above, the external processor 2100 filters the sound source by using the filter coefficient which maximizes a ratio between the spatially averaged acoustic energy of the focusing zone selected by the user operation unit and the spatially averaged acoustic energy of a zone other than the selected focusing zone, and then generates the sound source signal.

By using the external processor 2100 shown in FIG. 8a, an in-vehicle sound control method according to the embodiment of the present invention can be applied to any existing vehicle because the vehicle AVN device 2300 provided in the vehicle can be used as it is.

Figure 8B:
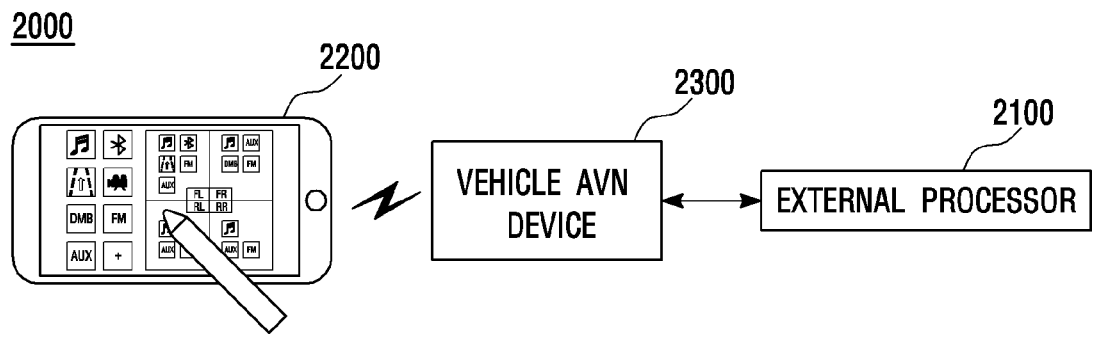
FIG. 8b is a block diagram showing a configuration of the vehicle AVN system according to the further another embodiment of the present invention.

In the embodiment shown in FIG. 8b, the user operation unit 2200 in the configuration of FIG. 8a is separately provided. The user operation unit 2200 of FIG. 8b may include a wireless communication module (not shown). At least one of the plurality of the sound sources input from the plurality of the source providers and a selection signal for the focusing zone of the sound source are transmitted to the external processor 2100 through the wireless communication module (not shown) by the user operation unit 2200.

The external processor 2100 generates the sound source signal on the basis of the selection signal received from the separately provided user operation unit 2200 and outputs the sound source signal by using the multi-channel amplifier provided in the vehicle AVN device 2300.

FIG. 8b shows that the user operation unit 2200 is implemented by a tablet PC. The user operation unit 2200 can be wirelessly connected to the vehicle AVN device 2300 by using various communication methods such as WiFi, Bluetooth, ZigBee, and Near Field Communication (NFC), etc.

Unlike this, the user operation unit 2200 may be implemented by a wirelessly connected operation means such as various mobile terminals, a remote controller using an infrared signal, etc., or may be implemented by a wired operation means. For example, the user operation unit 2200 may be a jog-shuttle, a switch, a button, etc., which are provided in a steering wheel of the vehicle or may be an operation means separately provided on the seat zone (each seat armrest, door wall, rear side of the driver seat, rear side of the passenger seat, console box, etc.) in the vehicle, on the head lining, on the center fascia, on the dashboard, etc.

FIG. 9 is a flowchart of the in-vehicle sound control method according to the embodiment of the present invention.

First, various sound sources are input through the plurality of the source providers 1500-1 to 1500-n (S1600). Then, at least one of the plurality of the sound sources input through the plurality of the source providers 1500-1 to 1500-n and user's selection of the focusing zone of the sound source are detected by the user operation unit 1200 (S1610). Here, for the purpose of facilitating the user's selection, the displaying of the plurality of the sound sources and the plurality of the focusing zones may be performed first.

When the user's selection is detected, the sound source signal for focusing the output of the selected sound source on the focusing zone is generated (S1620). Here, the sound source signal is generated by filtering the sound source selected by using the filter coefficient which maximizes a ratio between the spatially averaged acoustic energy of the focusing zone and the spatially averaged acoustic energy of a zone other than the focusing zone.

Lastly, one or the plurality of the sound source signals are simultaneously or selectively output by the multi-channel amplifier 1400, so that the output of the selected sound source can be focused on the focusing zone.

While the present invention has been described from the viewpoint of the specific embodiment including the exemplary embodiment of the present invention, it can be understood by those skilled in the art that various substitutions and modifications can be made in the above-described configuration of the present invention. Also, structural and functional changes can be variously made without departing from the scope and spirit of the present invention. Therefore, the scope and spirit of the present invention should be construed broadly as described in the claims of the present specification.

INDUSTRIAL APPLICABILITY

According to the in-vehicle sound control method according to the embodiment of the present invention, it is possible to individually control the focusing zone of each sound output within the vehicle, and particularly to easily select and control the focusing zone of each sound without changing the location of the speaker within the vehicle. Further, according to the in-vehicle sound control method according to the embodiment of the present invention, the sound source and the focusing zone within the vehicle can be selected and controlled only by adding an external processor without replacing the AVN device provided in the vehicle.

The invention claimed is:

1. An in-vehicle sound control method comprising:
receiving various sound sources through a plurality of source providers;
detecting a user's selection of at least one of the plurality of the sound sources input through the plurality of the source providers and user's selection of a focusing zone of the sound source;
generating a sound source signal for focusing an output of a user's selected sound source on the focusing zone; and
outputting the generated sound source signal,
wherein an interior space of the vehicle is divided into a plurality of focusing zones, and wherein the in-vehicle sound control method further comprises storing a filter coefficient corresponding to each of the plurality of the focusing zones.

2. The in-vehicle sound control method of claim 1, further comprising displaying the plurality of the sound sources and a plurality of the focusing zones where the output of the sound source is focused.

3. The in-vehicle sound control method of claim 1, wherein the outputting the generated sound source signal outputs simultaneously or selectively the respective sound source signals corresponding to the plurality of the sound sources.

4. The in-vehicle sound control method of claim 1, wherein the generating a sound source signal filters the sound source on the basis of the filter coefficient corresponding to the focusing zone, and generates the sound source signal.

5. The in-vehicle sound control method of claim 1, wherein the filter coefficient maximizes a ratio between a spatially averaged acoustic energy of the focusing zone selected by the user operation unit and a spatially averaged acoustic energy of a zone other than the focusing zone.

* * * * *